ial aloes# UNITED STATES PATENT OFFICE.

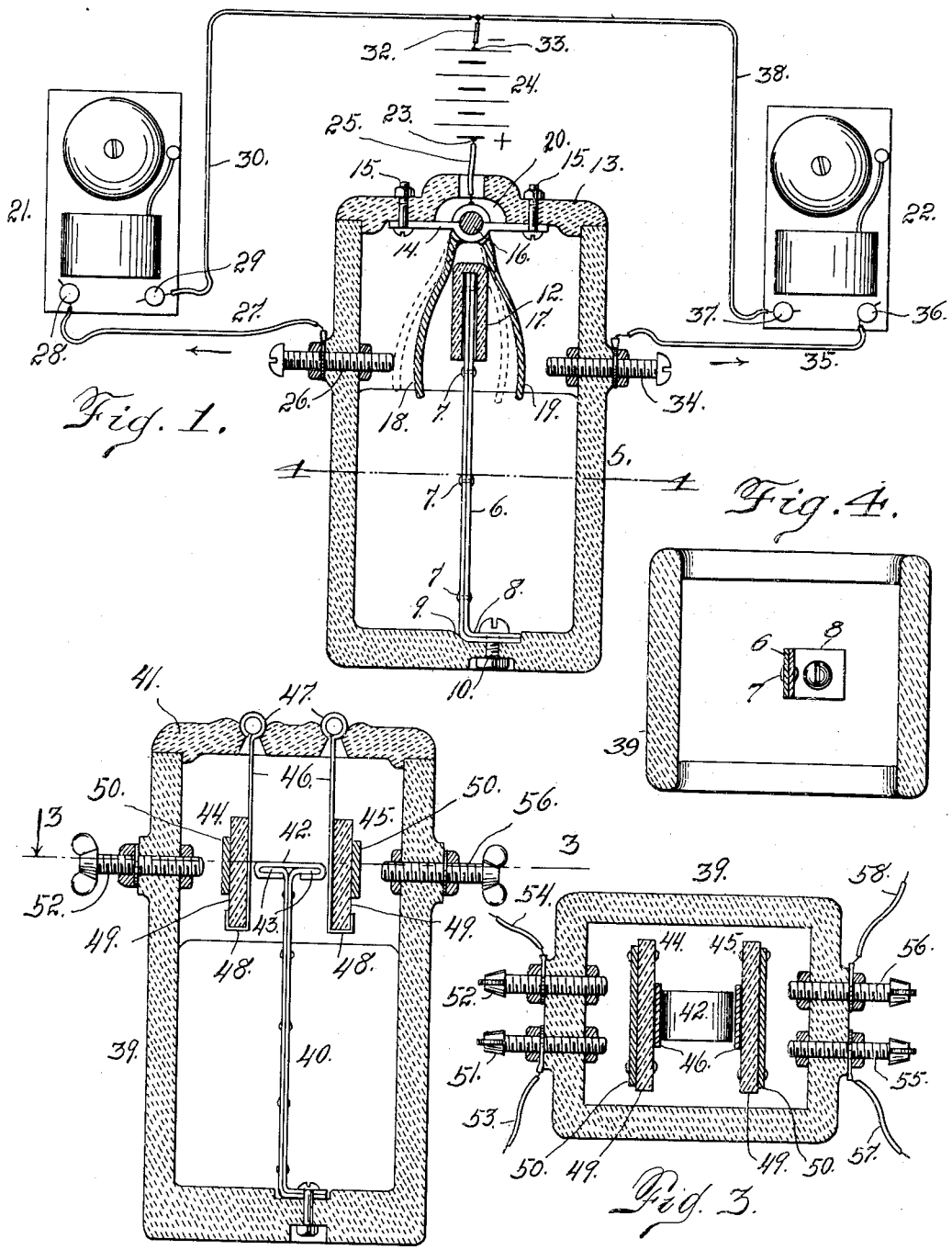

THOMAS CHAPMAN, OF DENVER, COLORADO.

THERMOSTAT.

1,034,689.

Specification of Letters Patent.

Patented Aug. 6, 1912.

Application filed April 14, 1911. Serial No. 621,047.

*To all whom it may concern:*

Be it known that I, THOMAS CHAPMAN, a citizen of the United States, residing in the city and county of Denver and State of Colorado, have invented certain new and useful Improvements in Thermostats; and I do declare the following to be a full, clear, and exact description of the invention, such as will enable others skilled in the art to which it appertains to make and use the same, reference being had to the accompanying drawings, and to the characters of reference marked thereon, which form a part of this specification.
My invention relates to improvements in thermostats.

An important feature of my present improvement consists in the fact that the thermostat bar which bends or changes its shape as the temperature rises and falls in its vicinity, is merely a device for actuating a circuit closing member, the circuit not passing through the thermostat bar.

Another important feature of the construction consists in the fact that the upper extremity of the thermosat bar which actuates the circuit closing member, is insulated from said member, preferably by a piece of glass doubled over the upper extremity of the bar and extending downwardly thereon a suitable distance.

The mechanism of my improved thermostat is mounted upon an insulating frame whose upper portion is closed to protect the parts of the mechanism from the weather, while its lower portion is entirely open on two opposite sides whereby the thermostat bar is exposed to atmospheric influences so far as temperature changes are concerned.
In the present case, for purposes of illustration I have shown and will describe my improved thermostat employed as a circuit closer and used for the purpose of sounding an alarm device to indicate the rise and fall of the temperature in the vicinity of the thermostat.

In carrying out my invention I suitably mount a thermostat bar, composed of two different materials having different ratios of expansion and contraction, on a frame composed of non-conducting material. The thermostat bar is rigidly secured at one extremity to the bottom of the frame and extends upwardly therefrom, its upper ex-
tremity being free and adapted to move laterally under the influence of the varying temperature in the vicinity of the thermostat. To the top of the frame which is inclosed as aforesaid is pivotally connected a depending circuit closing member adapted to be engaged by the free extremity of the thermostat bar.

I employ two alarm devices, each located in an electrical circuit, the poles of which circuit are respectively connected with the circuit closing member and with contacts located on the said frame. The circuit is adapted to be closed through one of these alarm devices when the temperature rises beyond a certain degree, while the circuit is adapted to be closed through the other alarm device when the temperature falls beyond a certain degree. The contacts mounted on the frame of the device are adjustable to and from the circuit closing member in order to regulate the degree of the temperature at which the thermostat bar will cause the circuit closing member to engage the said contacts.

Having briefly outlined my improved construction I will proceed to describe the same in detail, reference being made to the accompanying drawing in which is illustrated an embodiment thereof.

In this drawing Figure 1 is a vertical section of the device shown in connection with alarm devices. Fig. 2 is a similar section of a modified form of construction. Fig. 3 is a horizontal section taken on the line 3—3, Fig. 2, looking in the direction of the arrow. Fig. 4 is a cross-section taken through the lower portion of the frame, looking toward the bottom of the same.

The same reference characters indicate the same parts in all views.

Let the numeral 5 designate a frame whose wall is composed of suitable material which is a non-conductor of electricity. On this frame is mounted the thermostat bar 6, its two members being secured together by means of rivets 7. The materials employed in this thermostat bar are preferably iron and zinc. However, other materials may be employed to equal advantage. One extremity of the thermostat bar 6 is bent at an angle thereto as shown at 8, and secured within a recess 9 to the bottom of the frame by means of a bolt 10. The opposite extremity of the bar 6 is free and provided with a cap 12 of insulating material, preferably glass. To the under side of the top of the frame is secured a plate 14 by means of bolts 15. Upon this plate is pivotally mounted, as shown at 16, a depending circuit closing member 17 composed of separated parts 18 and 19 between which the free extremity of the thermostat bar protrudes. The under side of the top 13 is provided with a recess 20 in order to make room for the pivot of the circuit closing member 17.

The numeral 21 represents the high temperature alarm device, and the numeral 22 the low temperature alarm device. Each of these alarm devices is located in an electric circuit. The circuit in which the high temperature alarm device is located may be traced as follows: From one pole 23 of a source of electricity 24 leads a wire 25 to the circuit closing member 17, through the part 18, put in the dotted line position, to a contact screw 26, thence from this contact screw through a wire 27 to a binding post 28 of the alarm device 21, thence from the opposite binding post 29 to the said alarm device through a wire 30 and the wire 32 to the opposite pole 33 of the source of electricity. The circuit through the low temperature device 22 may be traced as follows: from the pole 23 of the source of electricity 24, through the wire 25 to the part 19 of the circuit closing member, through a contact screw 34, when the part 19 is in engagement with the said screw through a wire 35 to a binding post 26 of the alarm device 22, thence from the opposite binding post 37 of the said alarm device, through a wire 38 and the wire 32, to the opposite pole 33 of the source of energy 24, thus completing the circuit.

When the temperature rises beyond a certain degree, the thermostat bar 6 will be caused to move toward the left, carrying the circuit closing member 17 with it, until the part 18 of the said member engages the contact screw 26, whereby the circuit will be closed through the high temperature alarm device 21, and give notice of the fact that the temperature in the vicinity of the thermostat is above a certain degree. When the temperature lowers beyond a predetermined degree, the thermostat bar will be caused to move toward the right, causing the part 19 of the circuit closing member 17 to engage the contact screw 34, whereby the circuit will be closed through the low temperature alarm device 22 and give notice of the fact that the temperature has fallen beyond a predetermined degree.

In Figs. 2 and 3 I have shown a modified form of my invention, which modification comprises a frame 39, substantially the same as the frame 5 first described; and a thermostat bar 40 of substantially the same construction as the bar 6 disclosed in Fig. 1. The upper or free extremity of this thermostat bar 40 is provided with an insulating cap or crown 42 which interlocks with the outwardly bent extremities 43 of the two different materials composing the thermostat bar. Depending from the under side of the top 41 of the frame 39 are two circuit closing members 44 and 45, each of which comprises a support 46 pivotally mounted in the top of the frame as shown at 47, and having its lower or free extremity bent to form retaining hooks 48. In each of these hooks of the depending supports 46 is mounted an insulating block or plate 49, preferably composed of glass. Secured to each insulating block 49 is a contact member 50 composed of material forming a good conductor of electricity, as metal. In this modified form of my invention I mount two contact screws 51 and 52 upon the same side of the frame, and with which conductors 53 and 54 of an electric circuit are respectively connected. Upon the opposite side of the frame are mounted similar contact screws 55 and 56 connected respectively with conductors 57 and 58 which lead to the opposite poles of an electrical source not shown.

The operation of the modified form of construction is substantially the same as that of the first described form. However, when the thermostat bar 40 moves under the influence of rising or falling temperature conditions, it is caused to engage one of the circuit closing members 44 or 45, whereby one of the said members is caused to move so that its contact strip 50 will bridge the space between, or electrically connect, the contact screws 51 and 52 or 55 and 56, as the case may be.

Attention is called to the fact that the contact screws disclosed in the different views are adjustable to and from the circuit closing members, whereby the degree of temperature at which the circuit closing members will be caused to close the circuits may be varied.

As heretofore stated, it must be understood that the thermostat bar in both forms of construction does not form a part of the electrical circuit, since the same is entirely insulated from the elements of the circuit, the said bar serving only to actuate the circuit closing members or impart to them the necessary movement for circuit closing purposes. The insulation of the thermostat bar from the elements of the circuit is accomplished in the form of construction disclosed in Fig. 1 by means of the glass cap 12, and in the form disclosed in Figs. 2 and 3 by means of the glass blocks 49 interposed between the contact strips 50 and the pivoted supporting parts 46.

Having thus described my invention, what I claim is:

1. A thermostat comprising a frame, a thermostat bar mounted in the lower portion of the frame, the lower portion of the latter being open to the atmosphere while the upper portion is inclosed, and a pivotally-mounted circuit-closing member also carried by the frame in the inclosed part thereof, and arranged to be engaged and actuated by the free end of the thermostat bar when the temperature in the vicinity of the thermostat rises or falls beyond predetermined degrees, the thermostat bar being insulated from the circuit-closing member, substantially as described.

2. A thermostat comprising a frame, whose upper portion is inclosed and whose lower portion is open to the atmosphere, a thermostat bar rigidly secured to the lower part of the frame and projecting upwardly into the inclosed part thereof, a circuit-closing member pivotally mounted to the top of the frame and depending therefrom, the said circuit-closing member being arranged within the inclosed part of the frame, the said member comprising two separated parts between which the free end of the thermostat bar protrudes, the circuit-closing member being adapted to be engaged and actuated by the said bar when the temperature in the vicinity of the thermostat rises or falls beyond a predetermined degree, said thermostat bar being insulated from the circuit.

3. A thermostat comprising a frame, a thermostat bar mounted thereon and having one extremity rigidly secured and its opposite extremity free, an independent circuit-closing member pivotally mounted on the frame and depending vertically therefrom, the said circuit-closing member comprising separated parts between which the free extremity of the thermostat bar protrudes, the circuit-closing member being adapted to be engaged and actuated by the thermostat bar, the latter being at all times insulated from the circuit, substantially as described.

4. A thermostat comprising a frame, a thermostat bar mounted on the frame, an independent pivotally-mounted circuit-closing member carried by the frame and comprising separated parts, one of the said parts being adapted to be engaged and actuated by the thermostat bar when the temperature in the vicinity of the thermostat rises beyond a certain degree, while the other part is adapted to be engaged and actuated by the thermostat bar when the temperature in the vicinity of the thermostat falls beyond a certain degree, said thermostat bar being insulated from the circuit.

5. A thermostat comprising a frame, a bar having one extremity fixedly secured and its opposite extremity free, an independent pivotally-mounted depending circuit-closing member, adapted to be engaged and actuated by the free extremity of the said bar, the latter being insulated from the circuit-closing member, the circuit closing member being composed of two separated parts between which the free end of the thermostat bar protrudes, and electric circuits adapted to be closed respectively by the parts of the circuit-closing member, substantially as described.

6. The combination with electrical circuits and alarm devices located therein, of a thermostat comprising a frame, a vertically disposed bar insulated from the circuits and carried by the frame and having one extremity fixedly secured to the lower part of the frame, and its opposite extremity free, and a pivotally-mounted independent circuit-closing member carried by the upper portion of the frame and comprising separated parts between which the free extremity of the thermostat bar protrudes, one of the said parts being adapted to close one of the circuits through one of the alarm devices when the temperature in the vicinity of the thermostat rises beyond a certain degree, while the other part of the circuit closing member is adapted to close the other circuit through the other alarm device when the temperature in the vicinity of the thermostat falls beyond a certain degree.

7. The combination with electrical circuits, and high temperature and low temperature signaling devices located respectively in the said circuits, of a thermostat comprising a bar insulated from the circuits, an independent pivotally-mounted depending circuit-closing member consisting of two separated parts between which the thermostat bar protrudes, one of the said parts being adapted to be engaged and moved into position to close the circuit through the high temperature signaling device when the temperature in the vicinity of the thermostat rises beyond a certain degree, while the other part is adapted to be engaged by the thermostat bar and moved into position to close the circuit through the low temperature signaling device when the temperature in the vicinity of the thermostat falls beyond a certain degree.

8. A thermostat comprising a frame composed of nonconducting material, and having one extremity mounted on the frame and its opposite extremity free, a pivotally-mounted circuit-closing member also carried by the frame and adapted to be engaged and actuated by the thermostat bar when the temperature in the vicinity of the thermostat bar rises or falls beyond a predetermined degree, the free extremity of the bar being provided with a cap of insulating material.

9. A thermostat comprising a frame, a thermostat bar mounted thereon and having one extremity rigidly secured and its opposite extremity free, and a circuit-closing member pivotally mounted on the frame and adapted to be engaged and actuated by the free extremity of the thermostat bar, the free extremity of the thermostat bar being provided with a cap composed of insulating material entirely surrounding the free extremity of the thermostat bar, for the purpose set forth.

In testimony whereof I affix my signature in presence of two witnesses.

THOMAS CHAPMAN.

Witnesses:
  WILMA H. COON,
  F. E. BOWEN.